July 10, 1923.
J. R. REYBURN
1,461,327
TREAD SECTION FOR ANTISKID DEVICES FOR VEHICLE WHEELS
Original Filed June 18, 1919
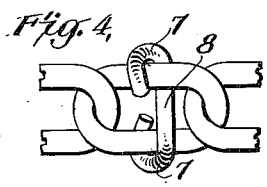
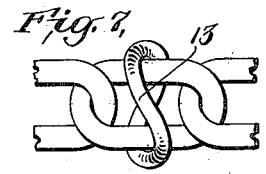
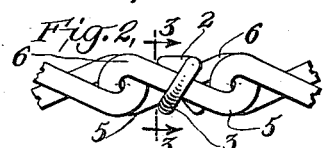
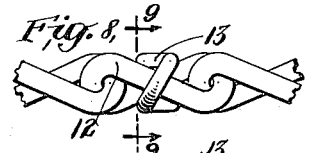
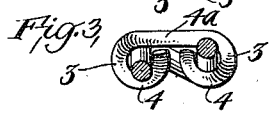
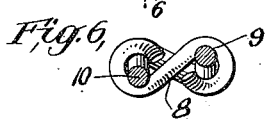
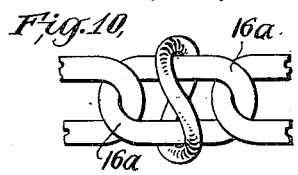
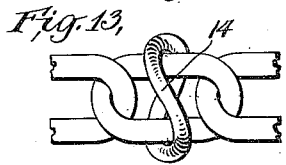
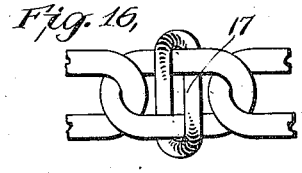
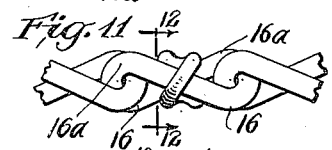
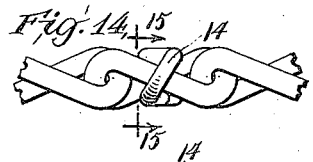
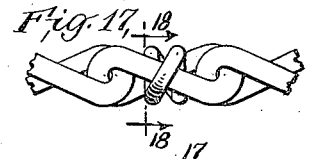
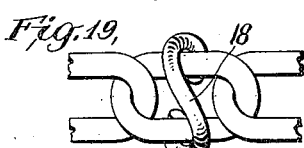
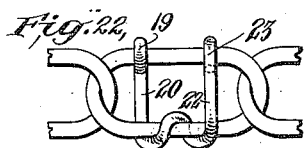
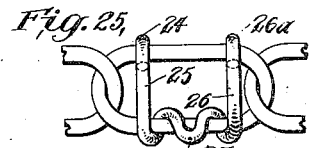
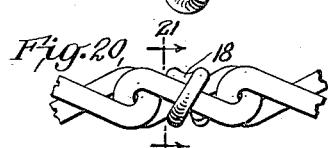
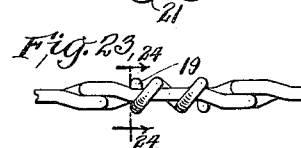
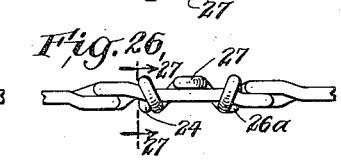
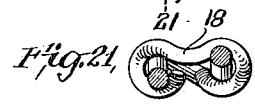
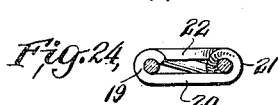
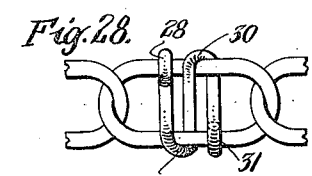
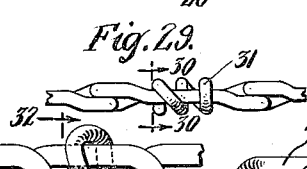
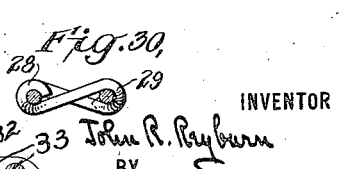
INVENTOR
John R. Reyburn
BY
Frederick S. Duncan
ATTORNEY Patented July 10, 1923.

1,461,327

UNITED STATES PATENT OFFICE.

JOHN R. REYBURN, OF FAIRFIELD, CONNECTICUT, ASSIGNOR TO AMERICAN CHAIN COMPANY, INC., A CORPORATION OF NEW YORK.

TREAD SECTION FOR ANTISKID DEVICES FOR VEHICLE WHEELS.

Continuation of application Serial No. 305,139, filed June 18, 1919. This application filed March 1, 1921, Serial No. 448,764.

*To all whom it may concern:*

Be it known that I, JOHN R. REYBURN, a citizen of the United States, and a resident of Fairfield, in the county of Fairfield, State of Connecticut, have made certain new and useful Improvements in Tread Sections for Antiskid Devices for Vehicle Wheels, of which the following is a specification, taken in connection with the accompanying drawings, which form a part of the same.

This application is a continuation in part of my application, Serial No. 305,139, filed June 18th, 1919, for tread sections for antiskid devices for vehicle wheels.

The object of my invention is the construction of tread chain or sections for antiskid devices for vehicle wheels that will afford a maximum of durability in conjunction with adequate traction and resistance to skidding, a minimum of vibration and tire wear, and that can be easily and cheaply manufactured.

I have embodied my invention in a number of forms, some of which are shown in the drawings and herein described and it is to be understood that the forms shown are illustrative embodiments only and that variations and modifications of them may be made that will, nevertheless, be within the scope of my invention as defined in the claims hereto appended.

Referring to the drawings:

Figure 1 is a top view, Figure 2 is a side view, and Figure 3 is a view in cross section on the line 3—3 of Figure 2, showing the novel features of construction and one embodiment of my invention.

Figure 4 is a top view, Figure 5 is a side view and Figure 6 is a view in cross section on the line 6—6 of Figure 5, showing a modification of my invention.

Figure 7 is a top view, Figure 8 is a side view and Figure 9 is a view in cross section on the line 9—9 of Figure 8, showing another modification of my invention.

Figure 10 is a top view, Figure 11 is a side view and Figure 12 is a view in cross section on the line 12—12 of Figure 11, showing another modification of my invention.

Figure 13 is a top view, Figure 14 is a side view and Figure 15 is a view in cross section on the line 15—15 of Figure 14, showing another modification of my invention.

Figure 16 is a top view, Figure 17 is a side view and Figure 18 is a view in cross section on the line 18—18 of Figure 17, showing another modification of my invention.

Figure 19 is a top view, Figure 20 is a side view and Figure 21 is a view in cross section on the line 21—21 of Figure 20, showing another modification of my invention.

Figure 22 is a top view, Figure 23 is a side view and Figure 24 is a view in cross section on the line 24—24 of Figure 23, showing another modification of my invention.

Figure 25 is a top view, Figure 26 is a side view and Figure 27 is a view in cross section on the line 27—27 of Figure 26, showing another modification of my invention.

Figure 28 is a top view, Figure 29 is a side view and Figure 30 is a view in cross section on the line 30—30 of Figure 29, showing another modification of my invention.

Figure 31 is a top view and Figure 32 is a view in cross section on the line 32—32 of Figure 31, showing another modification of my invention.

In Figures 1, 2 and 3 of the drawings I show an ordinary twisted chain link, the side strands 1, 1 of which are connected approximately midway between the ends by a contact body consisting of a cross link composed of a single section of wire or strand-like body comprising the connecting strand 2, and the loops 3, 3, each of which encircles one side strand of the link in a sufficient arc to maintain an inseparable connection therewith. The wire of which the cross link is composed should preferably be of such diameter that its contact surfaces 4, 4 and 4$^a$ will approximately be in a line connecting the contact surfaces 5, 5 and 6, 6, respectively, of the link.

By the terms "strands" throughout the specification and claims, is meant any two opposite portions of the material of the link.

In Figures 4, 5 and 6 I show my invention embodied in a modified structure wherein the loops 7, 7 of the cross link constituting the contact body are turned in opposite directions with respect to the connecting strand 8, the connecting strand 8 passing over one side strand 9 of the link and under the other side strand 10.

In Figures 7, 8 and 9 a twisted link 12 is shown provided with an elongated cross link comprising a single loop 13, which may be composed of an endless strand or of a similar loop 14 with abutting ends as shown in Figures 13, 14 and 15.

In Figures 10, 11, 12, 16, 17, 18, 19, 20 and 21 I show three further modifications in connection with the link of the twisted type above described. One modification, which is best shown in Figure 12, comprises a cross link 15 composed of an endless section, the connecting strands of the cross link being bent or depressed toward each other intermediate the ends of the cross link, thus exposing to the tread surface two separate contact surfaces 16, 16 and 16ª 16ª respectively on each side instead of the one contact surface on each side presented by the construction shown in Figure 9. A similar additional number of contact surfaces over those shown in Figure 9 may be obtained by the construction best shown in Figure 18, wherein each side strand of the twisted chain link is surrounded by a loop of an elongated cross link of the type shown in Figure 9 but twisted on itself so that its connecting strands cross each other, as at 17, between the side strands of the chain link. In another form, best shown in Figure 21, the cross link comprises a structure of the type shown in Figure 3, with the exception that the connecting strand 18 is depressed inwardly, thus increasing the number of contact surfaces over those shown in Figure 3.

In Figures 22, 23, 24, 25, 26, 27, 28, 29 and 30 I show three modifications of my invention in connection with the type of chain link, the side strands of which are parallel but the ends of which are twisted in opposite directions to a sufficient degree to permit the side strands of all of the links to lie in the same flat plane. Referring to Figures 22, 23, and 24, one of these modifications consists of a section of wire or strand-like material provided with a loop 19 to encircle one side strand of the chain link, a strand 20, a double turn 21 about the other side strand of the link, a strand 22 and a loop 23, as shown. In Figures 25, 26 and 27 I show a cross link of wire or strand-like material consisting of a loop 24, a strand 25, another strand 26, a loop 26ª and a half turn 27, the latter being formed from the intermediate portion of the section of wire and partially encircling a side strand of the chain link, as shown. In Figures 28, 29 and 30, I show a further modification consisting of a section of wire having a connection with one side strand of the link at 28, thence carried about the opposite strand of the link at 29, thence carried about the first mentioned strand at 30, and looped about it in a direction opposite to that of the loop about the first mentioned strand, and thence connected to the said opposite strand at 31.

In Figures 31 and 32, I show a further modification embodying a chain link of the type characterized by the fact that the side strands are diagonally disposed with respect to each other, or in other words, of the type of link shown in Figures 1 to 21, both inclusive.

In this modification, the cross link 32 has the form substantially of that shown in Figures 13, 14 and 15, with the exception that the free ends 33, 33 are extended by one another and bent inwardly towards the transverse axis of the link whereby each free end abuts against the side strand opposite to that about which it is bent. This particular modification is of a special value for the reason that the abutting of the ends of the cross link against the strands of the chain link lends additional support and stiffness to both over that which is supplied by the structure of some of the previous forms.

To explain more fully the tread contact points both of the chain link and the cross link take the greater part of the wear under service conditions with the consequence that they become much weaker than the remaining portions and hence, of course, more susceptible to bending and breaking. This tendency is to a very great extent counteracted by the stiffness and rigidity which is given the structure by causing the free ends of the cross link to abut against the strands of the chain link as described. When breakage finally occurs at one cross link contact, one straight end dropping off, the tendency of the remaining part to rotate about the side strand of the chain link it surrounds and thus possibly cut or puncture the tire is to a large extent counteracted, the remaining part being doubly prevented from thus rotating by reason of the straight end abutting a side strand, and the broken end embracing the same side strand.

If desired, connection between the contact bodies and links of all the forms herein shown may be considerably strengthened by welding or brazing. Also such of the cross links as are characterized by having ends abutting each other, may be welded or brazed even though the cross links themselves are not welded or brazed to the chain links. It is preferable that in all of the forms the wire of the cross links be of such dimensions that the tread contact surfaces both of the cross link and the chain link of a given unit shall be approximately in the same plane. Furthermore, it is preferable that the plane of the loops of the cross links shall be normal to the strands, this construction giving additional compactness and rigidity.

I do not however make these two features last mentioned an essential part of my invention as, under varying conditions, it might be advisable that the contact surfaces of the cross link should be located to the one side or the other of the plane of the contact surfaces of the chain link, and various other circumstances such, for example, as manufacturing requirements might make it advisable that the loops of the cross links be normal to the longitudinal axis of the chain link or set at some other desired angle.

The cross links should preferably be composed of wire or strand-like material which may be worked and connection made with the link by the operation of bending, preferably by a forming machine. In the case of all the forms shown, it is entirely optional with the user as to which side of the link shall be exposed to the tread surface. In fact the two sides are interchangeable and when one side has become worn to a given degree by action of the tread surface, the cross chain may be reversed and the opposite side exposed to the wear of the tread surface.

This invention has been described in connection with illustrative embodiments only, to the details of which it is not, of course, to be limited.

Having thus described my invention, I claim:

1. An anti-skid device for vehicle wheels, comprising a tread element including a chain link having oppositely arranged strands, and contact means for said strands comprising a section of wire extending transversely of the link and bent about said strands and connecting the same.

2. An anti-skid device for vehicle wheels, comprising a tread element including a chain link having oppositely arranged strands, and contact means for said strands comprising a wire link extending transversely of the first named link and having end portions receiving said strands therein, said transverse link serving to connect the side strands of the chain link.

3. An anti-skid device for vehicle wheels comprising, a tread element including a chain link having oppositely arranged strands, and contact means for said strands comprising a wire link extending transversely of the first named link and having end portions bent about said strands, said transverse link having its intermediate portion extending across the opening between the strands of the chain link, said transverse link serving to connect said strands.

4. An anti-skid device for vehicle wheels comprising, a tread element including a chain link having oppositely arranged strands, said chain link having contacting end portions, and contacting means for said strands comprising a wire link extending transversely of said chain link and having curved end portions receiving said strands, said curved end portions constituting contacting portions which are substantially flush with the said contacting end portions, said transverse link serving to connect said strands.

5. An anti-skid device for vehicle wheels comprising, a tread element including a twisted chain link having oppositely arranged diagonal strands, said chain link having contacting end portions extending outwardly beyond the intermediate portions of the diagonal strands, and contacting means for said strands, comprising a section of wire extending transversely of said chain link and having curved end portions bent about said strands, said section of wire having a substantially smaller diameter than said strands, said curved end portions constituting contacting portions which are substantially flush with the said contacting end portions, said section of wire serving to connect said strands.

6. An anti-skid device for vehicle wheels comprising a tread element including a twisted chain link having oppositely arranged diagonal strands, said chain link having contacting end portions extending outwardly beyond the intermediate portions of the diagonal strands, and contacting means for said strands, comprising a section of wire extending transversely of said chain link and having free ends bent about said strands, said ends extending by each other and abutting against said strands.

7. An anti-skid device for vehicle wheels comprising a tread element including a twisted chain link having oppositely arranged diagonal strands, said chain link having contacting end portions, extending outwardly beyond the intermediate portion of the diagonal strands, and contacting means for said strands comprising a section of wire extending transversely of said chain link and having free ends curved about said strands, said ends extending by each other and abutting against said strands, the curved portions of said ends constituting contact bodies.

8. An anti-skid device for vehicle wheels comprising a tread element including a twisted chain link having oppositely arranged diagonal strands, said chain link having contacting end portions, extending outwardly beyond the intermediate portion of the diagonal strands, and contacting means for said strands comprising a section of wire extending transversely of said chain link and having free ends curved about said strands, said ends extending by each other and abutting against said strands, the curved portions of said ends constituting contact bodies, which are substantially flush with said contacting end portions.

9. An anti-skid device for vehicle wheels comprising a tread element including a chain link and contact means for said chain link comprising a section of wire extending across a portion of said chain link and bent about the same and connecting opposite strands thereof.

10. An anti-skid device for vehicle wheels comprising a tread element including a chain link, said chain link having contacting end portions and contacting means for said chain link comprising a wire link extending across a portion of said chain link and having curved end portions receiving strands of said chain link, said curved end portions constituting contacting portions which are substantially flush with the said contacting end portions, said wire link serving to connect said strands.

11. An anti-skid device for vehicle wheels comprising a tread element including a twisted chain link having oppositely arranged diagonal strands, said chain link having contacting end portions extending outwardly beyond the intermediate portions of the diagonal strands and contacting means for said chain link comprising a section of wire extending across a portion of said chain link and having free ends bent about the said chain link.

12. An anti-skid device for vehicle wheels, comprising a tread element including a twisted chain link having oppositely arranged diagonal strands, said chain link having contacting end portions, extending outwardly beyond the intermediate portions of the diagonal strands, and contacting means for said strands, comprising a section of wire extending obliquely across said chain link, spaced from said contacting end portions and having free ends curved about said strands, said ends extending by each other towards said side strands.

13. An anti-skid device for vehicle wheels, comprising a tread element including a twisted chain link having oppositely arranged diagonal strands, said chain link having contacting end portions, extending outwardly beyond the intermediate portion of the diagonal strands, and contacting means for said strands, comprising a reversely twisted link transversely encircling the said chain link.

14. An anti-skid device for vehicle wheels, comprising a tread element including a twisted chain link having oppositely arranged diagonal strands, said chain link having contacting end portions extending outwardly beyond the intermediate portions of the diagonal strands, and contacting means for said strands, comprising a section of wire extending transversely across said chain link and in contact with it, spaced apart from said contacting end portions and having free ends curved about said strands, said ends extending by each other towards said side strands.

JOHN R. REYBURN.